United States Patent
Takewaka et al.

(10) Patent No.: US 9,364,913 B2
(45) Date of Patent: Jun. 14, 2016

(54) METHOD FOR BRAZING SHEET MATERIAL AND HEAT EXCHANGER

(71) Applicants: DENSO CORPORATION, Kariya, Aichi-pref. (JP); Chiba Institute of Technology, Chiba (JP); Canon Machinery Inc., Kusatsu-shi, Shiga (JP); UACJ Corporation, Tokyo (JP)

(72) Inventors: Shin Takewaka, Takahama (JP); Shogo Yamada, Nagoya (JP); Shumpei Ozawa, Narashino (JP); Tohru Nagasawa, Kusatsu (JP); Haruhiko Matsushita, Kyoto (JP); Yasunaga Itoh, Tokyo (JP); Tomoki Yamayoshi, Tokyo (JP)

(73) Assignees: DENSO CORPORATION, Kariya, Aichi-pref. (JP); Chiba Institute of Technology, Chiba (JP); Canon Machinery Inc., Kusatsu-Shi, Shiga (JP); UACJ Corporation, Tokyo (JP)

( * ) Notice: Subject to any disclaimer, the term of this patent is extended or adjusted under 35 U.S.C. 154(b) by 0 days.

(21) Appl. No.: 14/264,432

(22) Filed: Apr. 29, 2014

(65) Prior Publication Data

US 2014/0329109 A1    Nov. 6, 2014

(30) Foreign Application Priority Data

May 1, 2013    (JP) .................................. 2013-096115

(51) Int. Cl.
| | |
|---|---|
| *B23K 31/02* | (2006.01) |
| *B23K 1/00* | (2006.01) |
| *B23K 1/20* | (2006.01) |
| *B23K 1/008* | (2006.01) |

(Continued)

(52) U.S. Cl.
CPC ............... *B23K 1/0012* (2013.01); *B23K 1/008* (2013.01); *B23K 1/012* (2013.01); *B23K 1/19* (2013.01); *B23K 1/20* (2013.01); *B23K 35/00* (2013.01); *B23K 35/004* (2013.01); *B23K 35/0222* (2013.01); *B23K 35/286* (2013.01); *B23K 35/38* (2013.01); *C22C 21/02* (2013.01); *F28D 1/0308* (2013.01); *F28F 3/025* (2013.01); *F28F 21/089* (2013.01); *B23K 2201/14* (2013.01); *B23K 2203/10* (2013.01); *F28F 2275/04* (2013.01); *Y10T 428/12764* (2015.01)

(58) Field of Classification Search
None
See application file for complete search history.

(56) References Cited

U.S. PATENT DOCUMENTS

| | | | | |
|---|---|---|---|---|
| 3,736,648 | A | * | 6/1973 | Spielberg et al. .......... 228/122.1 |
| 4,373,243 | A | * | 2/1983 | Nakamura ............... 29/890.039 |

(Continued)

FOREIGN PATENT DOCUMENTS

| | | |
|---|---|---|
| JP | 2002-326887 | 11/2002 |
| JP | 2004-250283 | 9/2004 |

(Continued)

*Primary Examiner* — Kiley Stoner
(74) *Attorney, Agent, or Firm* — Harness, Dickey & Pierce, P.L.C.

(57) ABSTRACT

In a method for brazing a sheet material without use of flux, an inert gas is firstly introduced into an oxygen pump to reduce an oxygen partial pressure in the inert gas to $1 \times 10^{-10}$ Pa or less, and the sheet material is heated in a brazing furnace in an atmosphere of the inert gas discharged from the oxygen pump. A core alloy of the sheet material or a brazing filler alloy cladded to a surface of the core alloy contains Mg. Both the core alloy and the brazing filler alloy may contain Mg. Accordingly, brazability of the sheet material is sufficiently improved.

12 Claims, 3 Drawing Sheets

(51) Int. Cl.
*B23K 1/012* (2006.01)
*B23K 1/19* (2006.01)
*B23K 35/00* (2006.01)
*B23K 35/28* (2006.01)
*B23K 35/38* (2006.01)
*B23K 35/02* (2006.01)
*C22C 21/02* (2006.01)
*F28F 3/02* (2006.01)
*F28F 21/08* (2006.01)
*F28D 1/03* (2006.01)

(56) References Cited

U.S. PATENT DOCUMENTS

| | | | | |
|---|---|---|---|---|
| 5,425,859 | A * | 6/1995 | Tench et al. | 205/704 |
| 6,599,645 | B2 * | 7/2003 | Wittebrood | 428/654 |
| 6,616,032 | B1 * | 9/2003 | Gasse et al. | 228/248.1 |
| 6,689,259 | B1 * | 2/2004 | Klein | 204/230.5 |
| 2003/0099856 | A1 * | 5/2003 | Takeno et al. | 428/654 |
| 2004/0149591 | A1 * | 8/2004 | Klein et al. | 205/628 |
| 2004/0238605 | A1 * | 12/2004 | Nishimura et al. | 228/264 |
| 2005/0072836 | A1 * | 4/2005 | Shabtay | 228/183 |
| 2006/0081682 | A1 | 4/2006 | Doko et al. | |
| 2008/0217187 | A1 | 9/2008 | Shirakawa et al. | |
| 2012/0064366 | A1 * | 3/2012 | Chang et al. | 428/654 |
| 2013/0320001 | A1 * | 12/2013 | Kondo | 219/686 |
| 2015/0118517 | A1 * | 4/2015 | Itoh et al. | 428/654 |

FOREIGN PATENT DOCUMENTS

| | | |
|---|---|---|
| JP | 2004-358519 | 12/2004 |
| JP | 2005-331339 | 12/2005 |
| JP | 2007-008750 | 1/2007 |
| JP | 2007-022912 | 2/2007 |
| JP | 2007-145611 | 6/2007 |
| JP | 2008-137875 | 6/2008 |
| JP | 2009-250686 | 10/2009 |
| JP | 2010-139305 | 6/2010 |
| JP | 2010-216017 | 9/2010 |
| JP | 2011-025276 | 2/2011 |
| JP | 2012-028715 | 2/2012 |
| WO | WO 2013168669 A1 * | 11/2013 |

* cited by examiner

METHOD FOR BRAZING SHEET MATERIAL AND HEAT EXCHANGER

CROSS REFERENCE TO RELATED APPLICATION

This application is based on and incorporates herein by reference Japanese Patent Application No. 2013-096115 filed on May 1, 2013.

TECHNICAL FIELD

The present disclosure relates to a method for brazing a sheet material without use of flux, and relates to a heat exchanger manufactured by the method.

BACKGROUND

Aluminum alloy is widely used due to its lightness in weight and high thermal conductivity, for example, for vehicular heat exchangers. Many heat exchangers are manufactured by heating and brazing a sheet material (so-called "brazing sheet") which has an aluminum core alloy cladded with a brazing filler alloy.

Since the brazing filler alloy of the sheet material contains aluminum as a major component, an oxide layer is easy to be formed on a surface of the brazing filler alloy during brazing of the sheet material. If the oxide layer is formed, fluidity (wettability) of the brazing filler alloy may decrease, and the brazing of the sheet material may be inhibited accordingly. Thus, a flux is generally applied to the brazing filler alloy in the brazing of the sheet material in order to remove the oxide layer from the surface of the brazing filler alloy.

However, if the flux is used in the brazing of the sheet material, a residue of the flux may be produced and may cause clogging of passages of the heat exchanger. As a measure for this, a brazing method without using a flux has been developed recently. For example, a brazing method using a sheet material, in which a core alloy or a brazing filler alloy contains Mg, is disclosed in Patent Document 1 (JP 2004-358519 A corresponding to US 2006/0081682 A1).

Mg has a property of destroying the oxide layer of the brazing filler alloy. Thus, by adding Mg to the core alloy or the brazing filler alloy, the fluidity (wettability) of the brazing filler alloy can be improved, and the sheet material can be brazed easily. The brazing is performed, for example, in an inert gas atmosphere under an oxygen partial pressure of 20 Pa approximately.

However, the property of destroying the oxide layer of Mg is generally lower than that of flux. Thus, though the oxide layer of the brazing filler alloy is removed by Mg, the surface of the brazing filler alloy may be oxidized again by a tiny amount of oxygen. In this case, the fluidity (wettability) of the brazing filler alloy may decrease due to the oxide layer formed again, and the brazing filler alloy may not spread sufficiently. As a result, a fillet of the brazing filler alloy may be not formed, or the shape of the fillet may be unstable. In other words, brazability of the sheet material may not be improved sufficiently.

SUMMARY

It is an objective of the present disclosure to provide a method for brazing a sheet material, and a heat exchanger manufactured by the brazing method, which are capable of improving brazability of the sheet material without use of flux.

According to an aspect of the present disclosure, a method for brazing a sheet material without use of flux is disclosed. The sheet material includes a core alloy and a brazing filler alloy. The core alloy contains Al as a major component, more than 0 mass % and less than or equal to 1.8 mass % of Mn, and unavoidable impurities. The brazing filler alloy is cladded to a surface of the core alloy, and the brazing filler alloy contains Al as a major component, 0.1 to 1.2 mass % of Mg, 4 to 13 mass % of Si, and unavoidable impurities. In the method, a partial pressure of oxygen contained in an inert gas is reduced, and the sheet material is joined in an atmosphere of the inert gas. In the reducing of the partial pressure of oxygen, the inert gas is introduced into an oxygen pump provided with a solid electrolyte having an oxygen ion conductivity, and a voltage is applied to the solid electrolyte to reduce the partial pressure of oxygen to $1\times10^{-10}$ Pa or less. In the joining of the sheet material, the inert gas is introduced from the oxygen pump into a brazing furnace, and the sheet material is heated in the atmosphere of the inert gas in the brazing furnace.

According to another aspect of the present disclosure, a method for brazing a sheet material without use of flux is disclosed. The sheet material includes a core alloy and a brazing filler alloy. The core alloy contains Al as a major component, 0.3 to 1.3 mass % of Mg, more than 0 mass % and less than or equal to 1.8 mass % of Mn, and unavoidable impurities. The brazing filler alloy is cladded to a surface of the core alloy, and the brazing filler alloy contains Al as a major component, 4 to 13 mass % of Si, and unavoidable impurities. In the method, a partial pressure of oxygen contained in an inert gas is reduced, and the sheet material is joined in an atmosphere of the inert gas. In the reducing of the partial pressure of oxygen, the inert gas is introduced into an oxygen pump provided with a solid electrolyte having an oxygen ion conductivity, and a voltage is applied to the solid electrolyte to reduce the partial pressure of oxygen to $1\times10^{-10}$ Pa or less. In the joining of the sheet material, the inert gas is introduced from the oxygen pump into a brazing furnace, and the sheet material is heated in the atmosphere of the inert gas in the brazing furnace.

Accordingly, a fillet of the brazing filler alloy can be formed easily, and brazability of the sheet material can be improved sufficiently without use of flux.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
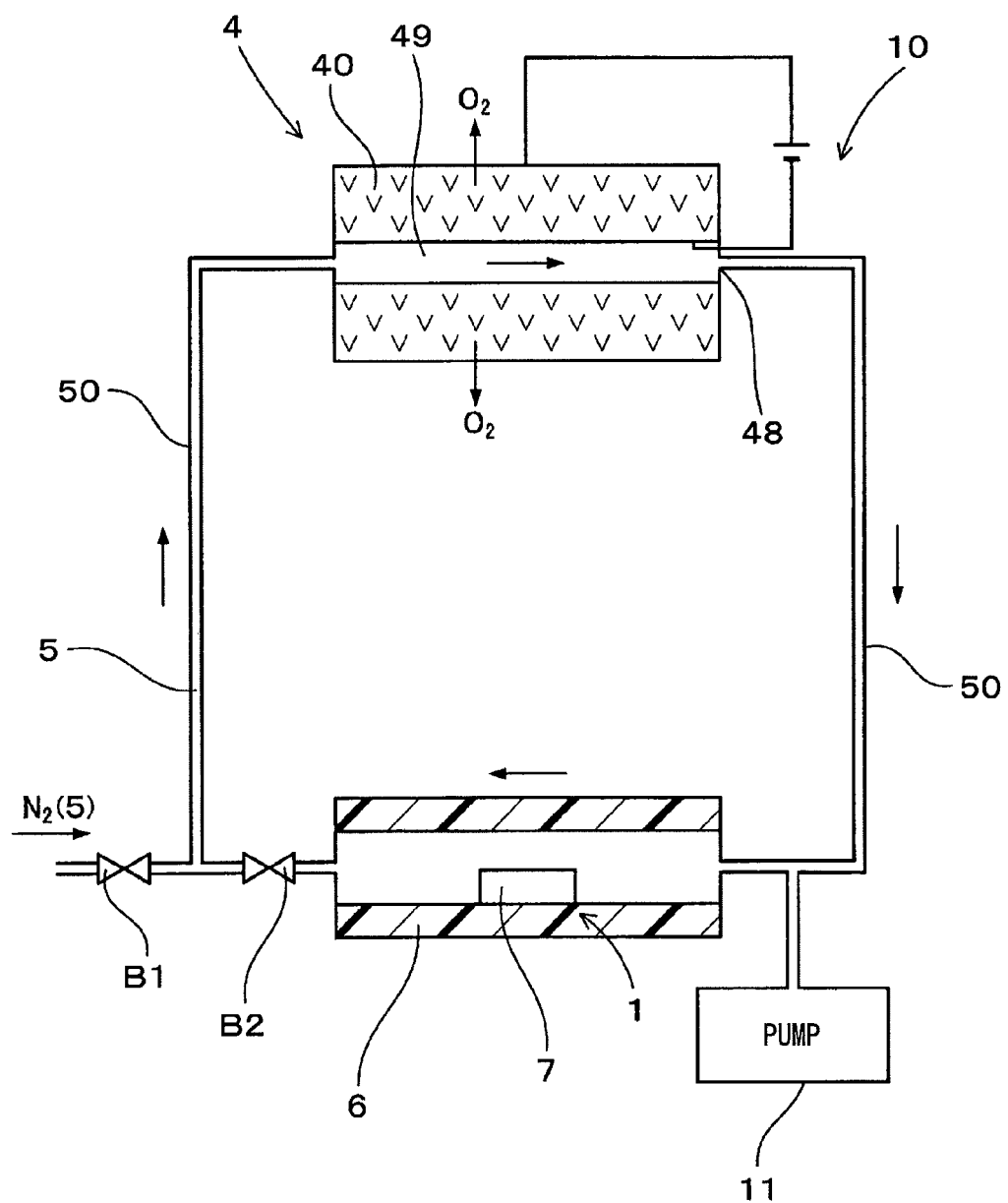
FIG. 1 is a schematic diagram illustrating an oxygen pump and a brazing furnace which are provided in a gas circulation path, according to embodiments of the present disclosure.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 2:
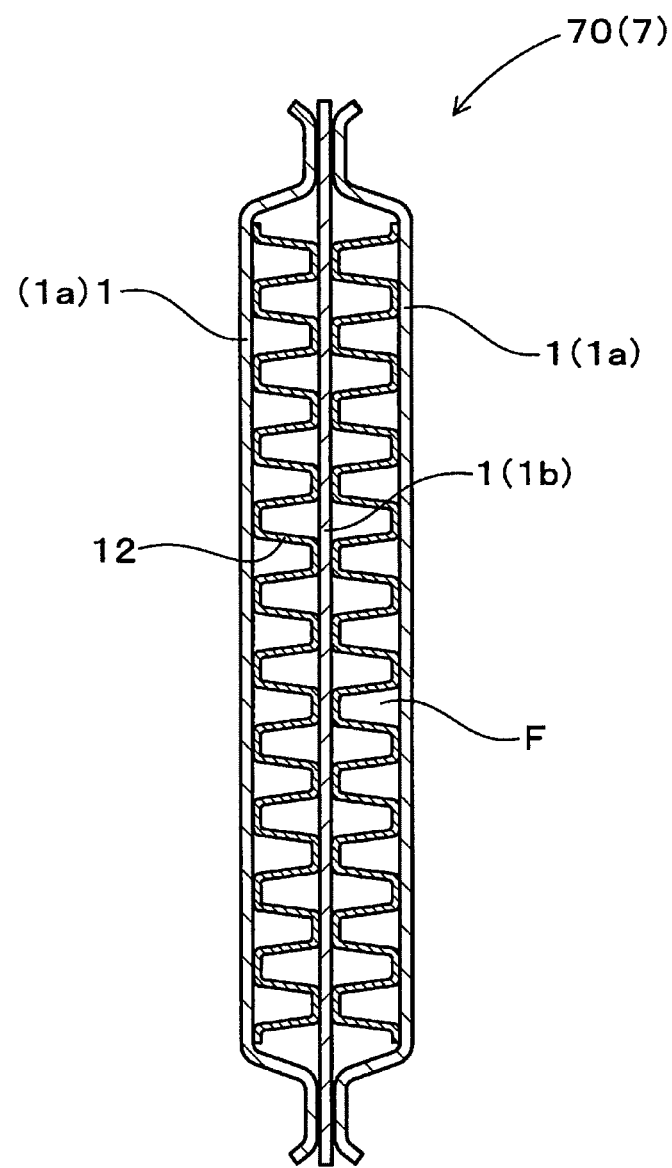
FIG. 2 is a sectional view illustrating a heat exchanger according to the embodiments.
Figure 3:
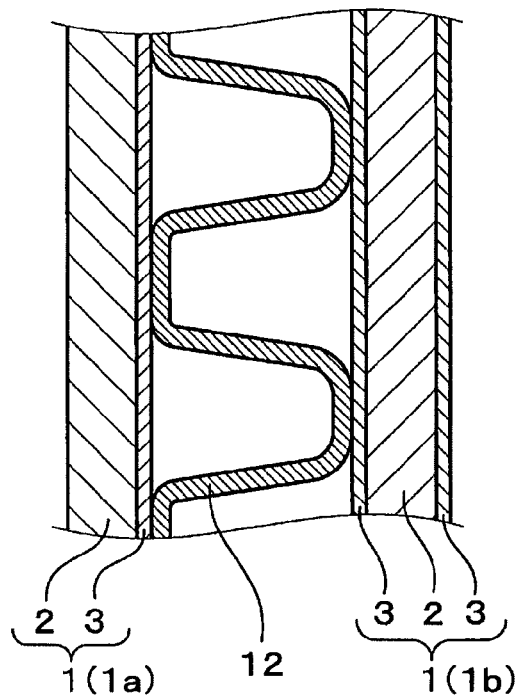
FIG. 3 is a sectional view illustrating a part of the heat exchanger according to the embodiments.

A first embodiment of a brazing method will be described with reference to FIGS. 1 to 4. As shown in FIGS. 2 and 3, in the present embodiment, a sheet material 1 (brazing sheet) is brazed without application of flux. The sheet material 1 includes a core alloy 2 and a brazing filler alloy 3, and a surface of the core alloy 2 is cladded with the brazing filler alloy 3. The core alloy 2 contains Al (aluminum) as a major component, less than or equal to 1.8 mass % (except 0 mass %) of Mn (Manganese), and unavoidable impurities. The brazing filler alloy 3 contains Al as a major component, 0.1 to 1.2 mass % of Mg (magnesium), 4 to 13 mass % of Si (Silicon), and unavoidable impurities.

The brazing method of the present embodiment includes an oxygen reduction process and a brazing process. In the oxygen reduction process, as shown in FIG. 1, an inert gas 5 (e.g., nitrogen gas: $N_2$) is introduced into an oxygen pump 4 that includes a solid electrolyte 40 having an oxygen ion conductivity. Subsequently, a partial pressure of oxygen contained in the inert gas 5 is reduced to $1 \times 10^{-10}$ Pa or less by applying a direct-current voltage to the solid electrolyte 40.

In the brazing process, the sheet material 1 is subjected to thermal treatment in a predetermined inert gas atmosphere within a brazing furnace 6 and is brazed without using flux. The predetermined inert gas atmosphere is provided by introducing the inert gas 5 treated in the above-described oxygen reduction process into the brazing furnace 6.

In the present embodiment, the oxygen pump 4 and the brazing furnace 6 are connected by pipes 50 to provide a gas circulation path 10 in which the inert gas 5 circulates. When the sheet material 1 is brazed, two valves B1 and B2 are closed firstly, and an inside of the gas circulation path 10 is vacuumed by using a vacuum pump 11. Then, the first valve B1 is opened to introduce the inert gas 5 into the oxygen pump 4. The oxygen pump 4 has a flow passage 49 through which the inert gas 5 passes. A wall defining the flow passage 49 is made of zirconia (solid electrolyte 40), for example. When a direct-current voltage is applied to the solid electrolyte 40, oxygen molecules contained in the inert gas 5 flowing in the flow passage 49 is discharged to an exterior through the solid electrolyte 40. Accordingly, the partial pressure of oxygen contained in the inert gas 5 is reduced to $1 \times 10^{-10}$ Pa or less. The inert gas 5 is discharged from the flow passage 49 through a discharge port 48 of the oxygen pump 4 and is introduced into the brazing furnace 6.

Subsequently, the second valve B2 is opened, and the first valve B1 is closed. The inert gas 5 which has passed through the brazing furnace 6 is returned to the oxygen pump 4. Accordingly, the process (oxygen reduction process) to decrease the oxygen partial pressure by the oxygen pump 4 is performed while the inert gas 5 circulates in the gas circulation path 10. Simultaneously, the process (brazing process) to heat and braze the sheet material 1 is performed.

As shown in FIGS. 2 and 3, in the present embodiment, a heat exchanger 7 (tube member 70) is manufactured by using three sheets of sheet material 1 and two corrugated fins 12. The sheet materials 1 include two outer sheet materials 1a that are formed by bending, and a center sheet material 1b interposed between the two outer sheet materials 1a. Both side surfaces of the center sheet material 1b is cladded with the brazing filler alloy 3, and only one side surface of each of the two outer sheet materials 1a is cladded with the brazing filler alloy 3. The two corrugated fins 12 are positioned two spaces between the center sheet material 1b and the two outer sheet materials 1a, respectively. The corrugated fins 12 are obtained by corrugating a bare material made of aluminum alloy (e.g., JIS3003 aluminum alloy). The brazing filler alloys 3 of the sheet materials 1 are joined to the corrugated fins 12. Both end parts of each outer sheet material 1a and both end parts of the center sheet material 1b are joined to each other so as to provide the two spaces in which the two corrugated fins 12 are accommodated respectively.

The heat exchanger 7 is obtained by stacking the three sheets of sheet material 1 and the two corrugated fins 12 alternately and heating them in the brazing furnace 6. When the stacked sheets are heated, the brazing filler alloy 3 is melted. As a result, the outer sheet materials 1a and the corrugated fins 12 are brazed to each other, and the center sheet material 1b and the corrugated fins 12 are also brazed to each other. Additionally, the outer sheet materials 1a and the center sheet material 1b are brazed to each other. In the brazing, a fillet which is not shown in the drawings is formed, for example, between the corrugated fins 12 and the sheet materials 1. Moreover, a flow passage F through which a refrigerant flows is formed inside the heat exchanger 7.

The heat exchanger 7 of the present embodiment may be used for a power converter. For example, the power converter may be made as following. More than one above-described tubular heat exchanger 7 is manufactured, and the heat exchanges 7 and semiconductor modules (not shown in the drawings) including semiconductor devices are laminated alternately. The semiconductor modules are cooled by the heat exchangers 7.

An experiment is conducted to confirm effects of the present embodiment. As shown in Table 1 below, several kinds of sheet materials 1 varying in contents of Si, Mg and Bi (bismuth) contained in the brazing filler alloys 3 are prepared. In the present disclosure, a content of Si ranges 4 to 13 mass %, and a content of Mg ranges 0.1 to 1.2 mass %. A thickness of the brazing filler alloy 3 is set at 0.06 mm or 0.15 mm. Some of the brazing filler alloys 3 of the sheet materials 1 contain Bi, and a content of Mn in the core alloy 2 of each sheet material 1 is set at 1.2 mass %.

TABLE 1

| No. | Component | Composition [mass %] | | | | Filler Thickness [mm] | Furnace Atmosphere | | | Brazability |
|---|---|---|---|---|---|---|---|---|---|---|
| | | Si | Mn | Mg | Bi | | Gas | $PO_2$ [Pa] | Pressure | |
| 1 | Filler | 10 | — | 0.1 | 0.01 | 0.06 | $N_2$ | $1 \times 10^{-15}$ | N.P. (1 atm) | 2 |
| | Core | — | 1.2 | — | — | | | | | |
| 2 | Filler | 10 | — | 0.6 | 0.01 | 0.06 | $N_2$ | $1 \times 10^{-15}$ | N.P. | 1 |
| | Core | — | 1.2 | — | — | | | | | |

TABLE 1-continued

| No. | Component | Composition [mass %] Si | Mn | Mg | Bi | Filler Thickness [mm] | Furnace Atmosphere Gas | PO$_2$ [Pa] | Pressure | Brazability |
|---|---|---|---|---|---|---|---|---|---|---|
| 3 | Filler | 10 | — | 0.6 | — | 0.06 | N$_2$ | $1 \times 10^{-10}$ | N.P. | 2 |
|   | Core | — | 1.2 | — | — | | | | | |
| 4 | Filler | 10 | — | 1.2 | — | 0.06 | N$_2$ | $1 \times 10^{-10}$ | N.P. | 2 |
|   | Core | — | 1.2 | — | — | | | | | |
| 5 | Filler | 10 | — | 0.1 | 0.07 | 0.06 | N$_2$ | $1 \times 10^{-15}$ | N.P. | 2 |
|   | Core | — | 1.2 | — | — | | | | | |
| 6 | Filler | 4 | — | 0.6 | 0.01 | 0.15 | N$_2$ | $1 \times 10^{-16}$ | N.P. | 2 |
|   | Core | — | 1.2 | — | — | | | | | |
| 7 | Filler | 10 | — | 0.6 | 0.01 | 0.15 | N$_2$ | $1 \times 10^{-16}$ | N.P. | 2 |
|   | Core | — | 1.2 | — | — | | | | | |
| 8 | Filler | 10 | — | 0.1 | 0.07 | 0.06 | N$_2$ | $1 \times 10^{-10}$ | N.P. | 2 |
|   | Core | — | 1.2 | — | — | | | | | |

Figure 4:
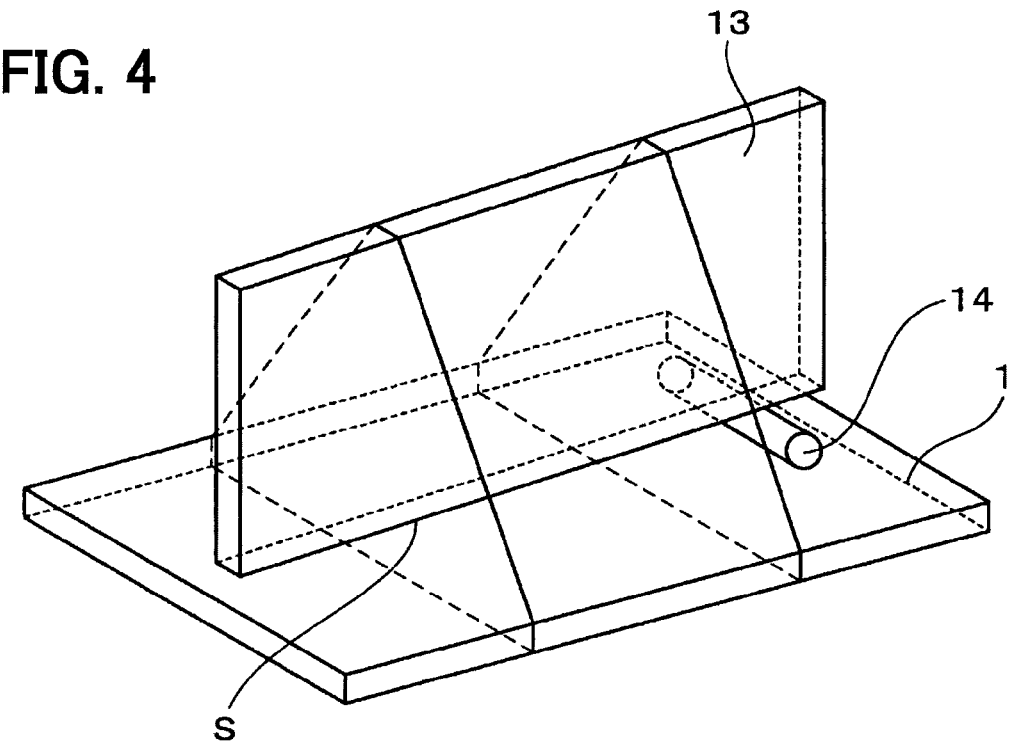
FIG. 4 is a perspective diagram illustrating a sample of a clearance filling test, according to the embodiments.

Samples 1 to 8 are prepared by using the several kinds of sheet materials 1 as listed in Table 1, and are subjected to a clearance filling test specified in Japanese Industrial Standard (WS) Z3263. More specifically, the samples 1 to 8 are prepared as following. As shown in FIG. 4, the sheet material 1 (horizontal member) is disposed horizontally, and a plate member 13 (vertical member) is attached to the sheet material perpendicular to the sheet material 1. Flux is not applied to the sheet material 1. The sheet material 1 has a width of 25 mm, a length of 60 mm and a thickness of 1.2 mm. The plate member 13 is an alloy plate made of JIS3003 aluminum alloy, and has a height of 8 mm, length of 55 mm and a thickness of 1.0 mm. A spacer rod 14 having a diameter of 1.6 mm is inserted between the sheet material 1 and the plate member 13. Accordingly, a clearance S is provided between the sheet material 1 and the plate member 13 so as to become wide with approaching the spacer rod 14.

The samples 1 to 8 prepared as described above are put into the brazing furnace 6 shown in FIG. 1, and the brazing process is performed. An oxygen partial pressure (PO$_2$) in the brazing varies within a range of the present disclosure, i.e. the oxygen partial pressure varies $1 \times 10^{-10}$ to $1 \times 10^{-16}$ Pa. The brazing process is performed under a normal pressure (N.P.), i.e. 1 atm.

The brazing is performed by heating the samples 1 to 8, to 600° C. in 15 minutes. Subsequently, the samples 1 to 8 are cooled to 200° C. and removed from the brazing furnace 6. From the start of heating to the end of cooling, the inert gas 5 is circulated in the gas circulation path 10.

In the brazing, the brazing filler alloys 3 of the samples 1 to 8 melt, and fillets of the brazing filler alloys 3 are formed in the above-described clearance S shown in FIG. 4. The higher brazability, the longer the fillet filled within the clearance S is. In other words, the higher brazability of the sample, the larger and nearer to the spacer rod 14 the fillet can be formed to be.

A length of the fillet filled in the clearance S shown in FIG. 4 is measured with respect to each of the samples 1 to 8 removed from the brazing furnace 6. When the length of the fillet is more than or equal to 30 mm, the brazability is defined as 1. When the length of the fillet is more than or equal to 15 mm and less than 30 mm, the brazability is defined as 2. When the length of the fillet is less than 15 mm, the brazability is defined as 3. The results are shown in Table 1.

Second Embodiment

A second embodiment is different from those of the first embodiment in a composition of a brazing filler alloy 3 and a composition of a core alloy 2. In the present embodiment, the core alloy 2 contains Mg. The core alloy 2 of the present embodiment contains Al as a major component, 0.3 to 1.3 mass % of Mg, less than or equal to 1.8 mass % (except 0 mass %) of Mn, and unavoidable impurities. The brazing filler alloy 3 of the present embodiment contains Al as a major component, 4 to 13 mass % of Si, and unavoidable impurities. The others are the same as the first embodiment.

An experiment is conducted to confirm effects of the present embodiment. As shown in Table 2 below, several kinds of sheet materials 1 varying in contents of Mg and Mn contained in the core alloy 2 are prepared. In the present disclosure, a content of Mg ranges 0.3 to 1.3 mass %, and a content of Mn is less than or equal to 1.8 mass %. A thickness of the brazing filler alloy 3 is set at 0.06 mm. Some of the brazing filler alloys 3 of the sheet materials 1 contain Bi, and a content of Si in the brazing filler alloy 3 of each sheet material 1 is set at 10 mass % or 13 mass %.

TABLE 2

| No. | Component | Composition [mass %] Si | Mn | Mg | Bi | Filler Thickness [mm] | Furnace Atmosphere Gas | PO$_2$ [Pa] | Pressure | Brazability |
|---|---|---|---|---|---|---|---|---|---|---|
| 9 | Filler | 10 | — | — | — | 0.06 | N$_2$ | $1 \times 10^{-15}$ | N.P. (1 atm) | 2 |
|   | Core | — | 1.2 | 0.3 | — | | | | | |
| 10 | Filler | 10 | — | — | — | 0.06 | N$_2$ | $1 \times 10^{-15}$ | N.P. | 2 |
|   | Core | — | 1.2 | 0.6 | — | | | | | |
| 11 | Filler | 10 | — | — | — | 0.06 | N$_2$ | $1 \times 10^{-10}$ | N.P. | 2 |
|   | Core | — | 1.2 | 0.6 | — | | | | | |
| 12 | Filler | 10 | — | — | — | 0.06 | N$_2$ | $1 \times 10^{-10}$ | N.P. | 1 |
|   | Core | — | 1.2 | 1.3 | — | | | | | |
| 13 | Filler | 10 | — | — | 0.07 | 0.06 | N$_2$ | $1 \times 10^{-15}$ | N.P. | 2 |
|   | Core | — | 1.2 | 0.3 | — | | | | | |

TABLE 2-continued

| No. | Component | Composition [mass %] | | | | Filler Thickness [mm] | Furnace Atmosphere | | | Brazability |
|---|---|---|---|---|---|---|---|---|---|---|
| | | Si | Mn | Mg | Bi | | Gas | PO$_2$ [Pa] | Pressure | |
| 14 | Filler | 10 | — | — | 0.15 | 0.06 | N$_2$ | $1 \times 10^{-15}$ | N.P. | 2 |
| | Core | — | 1.2 | 0.3 | — | | | | | |
| 15 | Filler | 10 | — | — | — | 0.06 | N$_2$ | $1 \times 10^{-15}$ | N.P. | 2 |
| | Core | — | 1.2 | 0.3 | — | | | | | |
| 16 | Filler | 13 | — | — | — | 0.06 | N$_2$ | $1 \times 10^{-15}$ | N.P. | 1 |
| | Core | — | 1.2 | 0.6 | — | | | | | |
| 17 | Filler | 10 | — | — | — | 0.06 | N$_2$ | $1 \times 10^{-15}$ | N.P. | 2 |
| | Core | — | 1.8 | 0.3 | — | | | | | |

Samples 9 to 17 are prepared by using the several kinds of sheet materials 1 as listed in Table 2, and have the same structures as the samples 1 to 8 of the first embodiment as shown in FIG. 4. The samples 9 to 17 are put into the brazing furnace 6 shown in FIG. 1 and are brazed. The oxygen partial pressure (PO$_2$) in the brazing is set at $1 \times 10^{-10}$ Pa or $1 \times 10^{-15}$ Pa as shown in Table 2.

A length of a fillet filled in a clearance S is measured with respect to the samples 9 to 17 removed from the brazing furnace 6. Accordingly, the brazabilities of the samples 9 to 17 are evaluated by using the same standard as that of the first embodiment. Results are shown in Table 2.

Third Embodiment

A third embodiment is different from the first embodiment in that both the brazing filler alloy and the core alloy contain Mg. In the present embodiment, several kinds of sheet materials 1 including core alloys 2 and brazing filler alloys 3 which have compositions shown in Table 3 below are prepared. In the present disclosure, a content of Mg contained in the brazing filler alloy 3 ranges 0.1 to 1.2 mass %, and a content of Mg contained in the core alloy 2 ranges 0.3 to 1.3 mass %. Samples 18 and 19 are prepared by using the sheet materials 1 as shown in FIG. 4. The samples 18 and 19 are put into the brazing furnace 6 shown in FIG. 1 and are brazed. The oxygen partial pressure (PO$_2$) in the brazing is set at $1 \times 10^{-10}$ Pa.

A length of a fillet filled in a clearance S is measured with respect to the samples 18 and 19 removed from the brazing furnace 6. Accordingly, the brazabilities of the samples 18 and 19 are evaluated by using the same standard as that of the first embodiment. Results are shown in Table 3.

COMPARATIVE EXAMPLE

Samples 20 to 29 are prepared as comparative examples of the present disclosure. As shown in Table 4 below, in the sample 20, a content of Mg contained in a brazing filler alloy 3 is less than a lower limit value: 0.1 mass %. In the sample 21, the content of Mg contained in the brazing filler alloy 3 is more than an upper limit value: 1.2 mass %. In the sample 22, a content of Mg contained in a core alloy 2 is less than a lower limit value: 0.3 mass %. In the sample 23, the content of Mg contained in the core alloy 2 is more than an upper limit value: 1.3 mass %. In the sample 24, a content of Si contained in the brazing filler alloy 3 is less than a lower limit value: 4 mass %.

TABLE 3

| No. | Component | Composition [mass %] | | | | Filler Thickness [mm] | Furnace Atmosphere | | | Brazability |
|---|---|---|---|---|---|---|---|---|---|---|
| | | Si | Mn | Mg | Bi | | Gas | PO$_2$ [Pa] | Pressure | |
| 18 | Filler | 10 | — | 0.1 | — | 0.06 | N$_2$ | $1 \times 10^{-10}$ | N.P. (1 atm) | 2 |
| | Core | — | 1.2 | 0.3 | — | | | | | |
| 19 | Filler | 10 | — | 0.2 | — | 0.06 | N$_2$ | $1 \times 10^{-10}$ | N.P. | 1 |
| | Core | — | 1.2 | 0.6 | — | | | | | |

In the sample 25, the content of Si contained in the brazing filler alloy 3 is more than an upper limit value: 13 mass %.

TABLE 4

| No. | Component | Composition [mass %] | | | | Filler Thickness [mm] | Furnace Atmosphere | | | Brazability |
|---|---|---|---|---|---|---|---|---|---|---|
| | | Si | Mn | Mg | Bi | | Gas | PO$_2$ [Pa] | Pressure | |
| 20 | Filler | 10 | — | 0.07 | 0.01 | 0.06 | N$_2$ | $1 \times 10^{-15}$ | N.P. (1 atm) | 3 |
| | Core | — | 1.2 | — | — | | | | | |
| 21 | Filler | 10 | — | 1.3 | — | 0.06 | N$_2$ | $1 \times 10^{-10}$ | N.P. | 3 |
| | Core | — | 1.2 | — | — | | | | | |

TABLE 4-continued

| No. | Component | Composition [mass %] Si | Mn | Mg | Bi | Filler Thickness [mm] | Furnace Atmosphere Gas | PO$_2$ [Pa] | Pressure | Brazability |
|---|---|---|---|---|---|---|---|---|---|---|
| 22 | Filler | 10 | — | — | — | 0.06 | N$_2$ | $1 \times 10^{-15}$ | N.P. | 3 |
|    | Core   | —  | 1.2 | 0.2 | — | | | | | |
| 23 | Filler | 10 | — | — | — | 0.06 | N$_2$ | $1 \times 10^{-15}$ | N.P. | 3 |
|    | Core   | —  | 1.2 | 1.6 | — | | | | | |
| 24 | Filler | 3  | — | 0.6 | 0.01 | 0.15 | N$_2$ | $1 \times 10^{-16}$ | N.P. | 3 |
|    | Core   | —  | 1.2 | — | — | | | | | |
| 25 | Filler | 15 | — | — | — | 0.06 | N$_2$ | $1 \times 10^{-15}$ | N.P. | — |
|    | Core   | —  | 1.2 | 0.6 | — | | | | | |
| 26 | Filler | 10 | — | — | 0.01 | 0.06 | N$_2$ | $1 \times 10^{-18}$ | N.P. | — |
|    | Core   | —  | 2.0 | 0.3 | — | | | | | |
| 27 | Filler | 10 | — | — | — | 0.06 | N$_2$ | 0.5 | N.P. | 3 |
|    | Core   | —  | 1.2 | 0.6 | — | | | | | |
| 28 | Filler | 10 | — | — | — | 0.06 | N$_2$ | $1 \times 10^{-8}$ | N.P. | 3 |
|    | Core   | —  | 1.2 | 0.6 | — | | | | | |
| 29 | Filler | 10 | — | — | — | 0.06 | N$_2$ | $1 \times 10^{-9}$ | N.P. | 3 |
|    | Core   | —  | 1.2 | 0.6 | — | | | | | |

In the sample 26, a content of Mn contained in the core alloy 2 is more than an upper limit: 1.8 mass %. In the samples 27 to 29, the composition of the sheet material 1 is within a range of the present disclosure, but the oxygen partial pressure in the brazing exceeds $1 \times 10^{-10}$ Pa. The sample 27 is brazed in a normal nitrogen-gas furnace instead of the brazing furnace 6 shown in FIG. 1.

These samples 20 to 29 are brazed, and lengths of fillets filled in clearances S are measured. The brazabilities of the samples 20 to 29 are evaluated by using the same standard as that of the first embodiment. Results are shown in Table 4.

(Analysis Results)

As shown in Tables 1 to 3, the brazabilities of the samples 1 to 19 of the embodiments of the present disclosure are 1 or 2 and thus may be high. On the other hand, as shown in Table 4, the brazabilities of the samples 20 to 24, and 27 to 29 of the comparative examples of the present disclosure are 3 and thus may not be high. The samples 25 and 26 cannot be subjected to the test for the reason described below.

The reason why the brazabilities of the samples 20 and 21 are low may be that the content of Mg in the brazing filler alloy 3 is out of the range 0.1 to 1.2 mass %.

The reason why the brazabilities of the samples 22 and 23 are low may be that the content of Mg in the core alloy 2 is out of the range 0.3 to 1.3 mass %. In the sample 23, the core alloy 2 is partially melted because the content of Mg in the core alloy 2 is 1.6 mass %, i.e. too high.

The reason why the brazability of the sample 24 is low may be that the content of Si of the brazing filler alloy 3 is out of the range 4 to 13 mass %. In the sample 25, an edge of the brazing filler alloy 3 is cracked because the content of Si of the brazing filler alloy 3 is 15 mass %, i.e. too high. Thus, the sample 25 cannot be subjected to the test. Also in the sample 26, an edge of the core alloy 2 is cracked because the content of Mn is 2.0 mass %, i.e. too high. Hence, the sample 26 also cannot be subjected to the test.

When the samples 27 to 29 are brazed, the oxygen partial pressure is out of the range less than or equal to $1 \times 10^{-10}$ Pa. Therefore, the brazabilities cannot be made to be 1 or 2, in other words, the brazabilities cannot be improved sufficiently.

According to the above-described experiments, the effects of the present disclosure can be confirmed. One reason why the samples 1 to 19 of the embodiments of the present disclosure are high in brazability may be the low oxygen partial pressure in the inert gas 5. More specifically, the samples 1 to 19 are brazed in an atmosphere of the inert gas 5 in which the oxygen partial pressure is reduced to $1 \times 10^{-10}$ Pa or less by the oxygen pump 4 including the solid electrolyte 40. Another reason why the samples 1 to 19 of the embodiments are high in brazability may be that the compositions of the brazing filler alloy 3 and the core alloy 2 are set within the ranges shown in Tables 1 to 3. Accordingly, an oxide layer on the surface of the brazing filler alloy 3 can be removed by action of Mg contained in the brazing filler alloy 3 or the core alloy 2. Furthermore, since the oxygen partial pressure in the inert gas 5 is less than or equal to $1 \times 10^{-10}$ Pa, i.e. extremely low, the surface of the brazing filler alloy 3 can be prevented from oxidizing again after the removal of the oxide layer due to the action of Mg. Thus, fluidity (wettability) of the brazing filler alloy 3 can be kept high, and can be spread in the brazing. As a result, the fillet can be formed easily, and the brazability of the sheet material 1 can be improved sufficiently even without using flux.

The reason why the brazability is improved in the present disclosure will be described in more detail. When the sheet material 1 is brazed, Mg contained in the brazing filler alloy 3 or the core alloy 2 affects the oxide layer of the surface of the brazing filler alloy 3, and thus a spinel compound: Al$_2$MgO$_4$ is formed in the oxide layer. Accordingly, the oxide layer is weakened, and the fluidity (wettability) of the brazing filler alloy 3 is improved. Since the core alloy 2 and the brazing filler alloy 3 generally have a difference therebetween in coefficient of thermal expansion, the sheet material 1 may bend due to the heating, and a cracking may be generated in the oxide layer. In this case, the brazing filler alloy 3 may be exposed from the cracking, and the fluidity (wettability) of the brazing filler alloy 3 may be improved. An object, to which the sheet material 1 is brazed, such as the corrugated fin 12 shown in FIG. 2, also has an oxide layer thereon. Since there is also a difference in coefficient of thermal expansion between a base material of the brazed object and the oxide layer on the brazed object, a cracking may be generated in the oxide layer on the brazed object. Therefore, when the brazing filler alloy 3 and the brazed object are prevented from oxidizing by setting the oxygen partial pressure in the inert gas smaller than or equal to $1 \times 10^{-10}$ Pa, the base material exposed from the cracking of the oxide layer of the brazed object can be made to be in contact with the brazing filler alloy 3 exposed from the cracking of the oxide layer. Consequently, the brazing filler alloy 3 can be joined to the brazed object easily.

According to the above-described embodiments, a method for brazing a sheet material, and a heat exchanger manufactured by the brazing method can be provided, while the brazability of the sheet material can be sufficiently improved without use of flux.

Although the present disclosure has been fully described in connection with the preferred embodiments thereof with reference to the accompanying drawings, it is to be noted that various changes and modifications will become apparent to those skilled in the art.

In a first example of the present disclosure, a method for brazing a sheet material 1 without use of flux is provided. The sheet material 1 includes a core alloy 2 and a brazing filler alloy 3. The core alloy 2 contains Al as a major component, more than 0 mass % and less than or equal to 1.8 mass % of Mn, and unavoidable impurities. The brazing filler alloy 3 is cladded to a surface of the core alloy, and the brazing filler alloy 3 contains Al as a major component, 0.1 to 1.2 mass % of Mg, 4 to 13 mass % of Si, and unavoidable impurities. In the method, a partial pressure of oxygen contained in an inert gas 5 is reduced, and the sheet material 1 is joined in an atmosphere of the inert gas 5. In the reducing of the partial pressure of oxygen, the inert gas 5 is introduced into an oxygen pump 4 provided with a solid electrolyte 40 having an oxygen ion conductivity, and a voltage is applied to the solid electrolyte 40 to reduce the partial pressure of oxygen to $1\times10^{-10}$ Pa or less. In the joining of the sheet material 1, the inert gas 5 is introduced from the oxygen pump 4 into a brazing furnace 6, and the sheet material 1 is heated in the atmosphere of the inert gas 5 in the brazing furnace 6.

In a second example of the present disclosure, another method for brazing a sheet material 1 without use of flux is provided. The sheet material 1 includes a core alloy 2 and a brazing filler alloy 3. The core alloy 2 contains Al as a major component, 0.3 to 1.3 mass % of Mg, more than 0 mass % and less than or equal to 1.8 mass % of Mn, and unavoidable impurities. The brazing filler alloy 3 is cladded to a surface of the core alloy 2, and the brazing filler alloy 3 contains Al as a major component, 4 to 13 mass % of Si, and unavoidable impurities. In the method, a partial pressure of oxygen contained in an inert gas 5 is reduced, and the sheet material 1 is joined in an atmosphere of the inert gas 5. In the reducing of the partial pressure of oxygen, the inert gas 5 is introduced into an oxygen pump 4 provided with a solid electrolyte 40 having an oxygen ion conductivity, and a voltage is applied to the solid electrolyte 40 to reduce the partial pressure of oxygen to $1\times10^{-10}$ Pa or less. In the joining of the sheet material 1, the inert gas 5 is introduced from the oxygen pump 4 into a brazing furnace 6, and the sheet material 1 is heated in the atmosphere of the inert gas 5 in the brazing furnace 6.

In the brazing method of the first example, the oxygen partial pressure in the inert gas 5 is reduced to $1\times10^{-10}$ Pa or less by using the oxygen pump 4 having the solid electrolyte 40 in an oxygen reduction process, and the sheet material 1 is heated and brazed in an atmosphere of the inert gas 5 in a brazing process. The brazing filler alloy 3 contains 0.1 to 1.2 mass % of Mg. Accordingly, an oxide layer on a surface of the brazing filler alloy 3 can be removed by Mg contained in the brazing filler alloy 3. Additionally, since the oxygen partial pressure is less than or equal to $1\times10^{-10}$ Pa, i.e. extremely low, the surface of the brazing filler alloy 3 can be prevented from oxidizing again after the removal of the oxide layer. Therefore, fluidity (wettability) of the brazing filler alloy 3 can be kept high, and the brazing filler alloy 3 can be spread accordingly during the brazing. As a result, a fillet of the brazing filler alloy 3 can be formed easily, and brazability of the sheet material 1 can be improved sufficiently without flux application.

Next, compositions in the core alloy 2 and the brazing filler alloy 3 will be described. The core alloy 2 contains Mn, and a content of Mn in the brazing filler alloy 3 is less than or equal to 1.8 mass %. By adding Mn to the core alloy 2, strength of the sheet material 1 can be increased. If the content of Mn exceeds 1.8 mass %, manufacturing of the material may become difficult.

The brazing filler alloy 3 contains 0.1 to 1.2 mass % of Mg. The Mg affects the oxide layer on the surface of the brazing filler alloy 3 to form a spinel compound: $Al_2MgO_4$ in the oxide layer. Accordingly, the oxide layer is weakened, and the fluidity (wettability) of the brazing filler alloy 3 is improved. If the content of Mg in the brazing filler alloy 3 is less than 0.1 mass %, the fluidity of the brazing filler alloy 3 cannot be improved sufficiently. On the other hand, if the content of Mg exceeds 1.2 mass %, a surface tension of the melted brazing filler alloy 3 reduces excessively, and capability of forming the fillet may decrease.

Moreover, the brazing filler alloy 3 contains 4 to 13 mass % of Si. If the content of Si is less than 4 mass %, the fluidity (wettability) of the brazing filler alloy 3 decreases, and the fillet is difficult to be formed. If the content of Si in the brazing filler alloy 3 exceeds 13 mass %, manufacturing of the material may become difficult.

In the brazing method of the second example, similar to the first embodiment, the oxygen partial pressure in the inert gas 5 is reduced to $1\times10^{-10}$ Pa or less by using the oxygen pump 4 having the solid electrolyte 40 in an oxygen reduction process, and the sheet material 1 is heated and brazed in an atmosphere of the inert gas in a brazing process. The core alloy 2 contains 0.3 to 1.3 mass % of Mg. Mg contained in the core alloy moves to the brazing filler alloy 3 during the brazing of the sheet material 1, and the oxide layer on the brazing filler alloy 3 can be removed by the Mg. Additionally, since the oxygen partial pressure is less than or equal to $1\times10^{-10}$ Pa, i.e. extremely low, the surface of the brazing filler alloy 3 can be prevented from oxidizing again after the removal of the oxide layer. Therefore, fluidity (wettability) of the brazing filler alloy 3 can be kept high, and the brazing filler alloy 3 can be spread accordingly during the brazing. As a result, a fillet of the brazing filler alloy 3 can be formed easily, and brazability of the sheet material 1 can be improved sufficiently without flux application.

Next, a composition of the core alloy 2 in the second example will be described. The core alloy contains 0.3 to 1.3 mass % of Mg. If the content of Mg is less than 0.3 mass %, a property of destroying the oxide layer of the brazing filler alloy 3 may decrease, and capability of forming the fillet becomes easy to reduce. If the content of Mg exceeds 1.3 mass %, the core alloy 2 may be melted partially or the brazing filler alloy 3 may eat into the core alloy 2 during the brazing.

In the second example, the core alloy 2 contains less than 1.8 mass % of Mn, and the brazing filler alloy 3 contains 4 to 13 mass % of Si. The meaning of these ranges of contents is similar to that of the above-described first example, and is thereby omitted.

As described above, according to the present disclosure, a method for brazing a sheet material, and a heat exchanger manufactured by the brazing method, which are capable of improving brazability without use of flux, can be provided.

In the brazing method of the first example, the core alloy 2 may further contain 0.3 to 1.3 mass % of Mg. In this case, both the core alloy 2 and the brazing filler alloy 3 contain Mg. Thus, the oxide layer on the surface of the brazing filler alloy 3 can be destroyed more certainly. Accordingly, the capability of forming the fillet can be increased, and the brazability of the sheet material 1 can be further improved.

Also, in the second example, the brazing filler alloy 3 may further contain 0.1 to 1.2 mass % of Mg. In this case also, both the core alloy 2 and the brazing filler alloy 3 contain Mg. Thus, the oxide layer on the surface of the brazing filler alloy 3 can be destroyed more certainly. Accordingly, the brazability of the sheet material 1 can be further improved.

A gas circulation path 10 may be provided between the oxygen pump 4 and the brazing furnace 6, and the oxygen reduction process and the brazing process may be performed simultaneously while the inert gas 5 circulates in the gas circulation path 10. In this case, the inert gas 5 having the oxygen partial pressure reduced by the oxygen pump 4 can be introduced into the brazing furnace 6, and the inert gas 5 discharged from the brazing furnace 6 can be returned to the oxygen pump 4. Therefore, the oxygen partial pressure can be reduced easily. Consequently, the oxide layer is more difficult to be formed on the surface of the brazing filler alloy 3, and the brazability of the sheet material 1 can be more improved.

The brazing filler alloy 3 may further contain 0.01 to 0.15 mass % of Bi. In this case, the surface tension of the brazing filler alloy 3 can be reduced by action of Bi, and thus the capability of forming the fillet of the brazing filler alloy 3 can be more improved. If the content of Bi is less than 0.01 mass %, the effect of reducing the surface tension of the brazing filler alloy 3 may be low, and the effect of improving the capability of forming of the fillet cannot be exerted sufficiently. If the content of Bi exceeds 0.15 mass %, the surface tension of the brazing filler alloy 3 may decrease excessively, and the capability of forming the fillet may decrease easily.

The above-described method may be used for manufacturing a heat exchanger 7. The heat exchanger 7 may become defective if a part of the fillet of the brazing filler alloy 3 is not formed. Thus, high brazability may be required in the heat exchanger 7. Since the above-described brazing method is superior in the capability of forming the fillet, it is effective to apply the brazing method for manufacturing a product requiring high brazability, such as the heat exchanger 7.

Additional advantages and modifications will readily occur to those skilled in the art. The disclosure in its broader terms is therefore not limited to the specific details, representative apparatus, and illustrative examples shown and described.

What is claimed is:

1. A method for manufacturing a heat exchanger that includes sheet materials and a flow passage through which a refrigerant passes, the method comprising:
   stacking the sheet materials;
   brazing the sheet materials without use of flux, each sheet material including (i) a core alloy containing Al as a major component, more than 0 mass % and less than or equal to 1.8 mass % of Mn, and unavoidable impurities, and (ii) a brazing filler alloy cladded to a surface of the core alloy, the brazing filler alloy containing Al as a major component, 0.1 to 1.2 mass % of Mg, 4 to 13 mass % of Si, 0.01 to 0.15 mass % of Bi, and unavoidable impurities; or
   each sheet material including (i) a core alloy containing Al as a major component, more than 0 mass % and less than or equal to 1.8 mass % of Mn, 0.3 to 1.3 mass % of Mg, and unavoidable impurities, and (ii) a brazing filler alloy cladded to a surface of the core alloy, the brazing filler alloy containing Al as a major component, 0.1 to 1.2 mass % of Mg, 4 to 13 mass % of Si, and unavoidable impurities; and
   producing a fillet length of more than or equal to 30 mm, wherein
   the brazing of the sheet materials includes:
      reducing a partial pressure of oxygen contained in an inert gas; and
      joining both side end parts of each sheet material, respectively, to both side end parts of adjacent sheet material to provide the flow passage between the sheet materials in an atmosphere of the inert gas,
   the reducing of the partial pressure of oxygen includes:
      introducing the inert gas into an oxygen pump provided with a solid electrolyte having an oxygen ion conductivity; and
      applying a voltage to the solid electrolyte to reduce the partial pressure of oxygen to $1 \times 10^{-10}$ Pa or less, and
   the joining of the both side end parts of the sheet materials includes:
      introducing the inert gas from the oxygen pump into a brazing furnace; and
      heating the sheet materials in the atmosphere of the inert gas in the brazing furnace.

2. The method according to claim 1, wherein the reducing of the partial pressure of oxygen and the joining of the sheet materials are performed simultaneously by circulating the inert gas in a gas circulation path provided between the oxygen pump and the brazing furnace.

3. A method for manufacturing a heat exchanger that includes sheet materials and a flow passage through which a refrigerant passes, the method comprising:
   stacking the sheet materials;
   brazing the sheet materials without use of flux, each sheet material including (i) a core alloy containing Al as a major component, 0.3 to 1.3 mass % of Mg, more than 0 mass % and less than or equal to 1.8 mass % of Mn, and unavoidable impurities, and (ii) a brazing filler alloy cladded to a surface of the core alloy, the brazing filler alloy containing Al as a major component, 4 to 13 mass % of Si, 0.01 to 0.15 mass % of Bi, and unavoidable impurities; or
   each sheet material including (i) a core alloy containing Al as a major component, more than 0 mass % and less than or equal to 1.8 mass % of Mn, 0.3 to 1.3 mass % of Mg, and unavoidable impurities, and (ii) a brazing filler alloy cladded to a surface of the core alloy, the brazing filler alloy containing Al as a major component, 0.1 to 1.2 mass % of Mg, 4 to 13 mass % of Si, and unavoidable impurities; and
   producing a fillet length of more than or equal to 30 mm, wherein
   the brazing of the sheet materials includes:
      reducing a partial pressure of oxygen contained in an inert gas, and
      joining both side end parts of each sheet material, respectively, to both side end parts of adjacent sheet material to provide the flow passage between the sheet materials in an atmosphere of the inert gas,
   the reducing of the partial pressure of oxygen includes:
      introducing the inert gas into an oxygen pump provided with a solid electrolyte having an oxygen ion conductivity; and
      applying a voltage to the solid electrolyte to reduce the partial pressure of oxygen to $1 \times 10^{-10}$ Pa or less, and
   the joining of the both side end parts of the sheet materials includes:
      introducing the inert gas from the oxygen pump into a brazing furnace; and heating the sheet materials in the atmosphere of the inert gas in the brazing furnace.

4. The method according to claim 3, wherein the reducing of the partial pressure of oxygen and the joining of the sheet materials are performed simultaneously by circulating the inert gas in a gas circulation path provided between the oxygen pump and the brazing furnace.

5. The method according to claim 1, wherein stacking the sheet materials further comprises stacking three sheets of sheet material and two corrugated fins alternately.

6. The method according to claim 5, wherein the three sheets of sheet material include two outer sheet materials having side surfaces and a center sheet material having side surfaces interposed between the two outer sheet materials.

7. The method according to claim 6, wherein brazing the sheet materials further includes cladding both side surfaces of the center sheet material with the brazing filler alloy and cladding only one side surface of each of the two outer sheet materials with the brazing filler alloy.

8. The method according to claim 6, wherein joining both side end parts of each sheet material further comprises joining both end parts of each of the two outer sheet materials and both end parts of the center sheet material to each other so as to provide two spaces in which the two corrugated fins are accommodated.

9. The method according to claim 3, wherein stacking the sheet materials further comprises stacking three sheets of sheet material and two corrugated fins alternately.

10. The method according to claim 9, wherein the three sheets of sheet material include two outer sheet materials having side surfaces and a center sheet material having side surfaces interposed between the two outer sheet materials.

11. The method according to claim 10, wherein brazing the sheet materials further includes cladding both side surfaces of the center sheet material with the brazing filler alloy and cladding only one side surface of each of the two outer sheet materials with the brazing filler alloy.

12. The method according to claim 10, wherein joining both side end parts of each sheet material further comprises joining both end parts of each of the two outer sheet materials and both end parts of the center sheet material to each other so as to provide two spaces in which the two corrugated fins are accommodated.

* * * * *